United States Patent

[11] 3,561,432

| [72] | Inventors | Shigeru Yamaki;<br>Rikizo Murata, Tokyo, Japan |
|---|---|---|
| [21] | Appl. No. | 740,737 |
| [22] | Filed | June 27, 1968 |
| [45] | Patented | Feb. 9, 1971 |
| [73] | Assignee | Olympus Optical Co., Ltd.<br>Shibuya-ku; Tokyo, Japan<br>a Japanese corporation |
| [32] | Priority | July 29, 1967, Aug. 16, 1967 |
| [33] | | Japan |
| [31] | | 42/48685 and 42/52539 |

[54] ENDOSCOPE
6 Claims, 11 Drawing Figs.

[52] U.S. Cl. .................................. 128/6,
350/255, 356/241
[51] Int. Cl. .................................. A61b 1/06
[50] Field of Search .......................... 128/4, 6, 5,
7, 8; 350/187, 255; 356/241

[56] References Cited
UNITED STATES PATENTS
| 1,995,196 | 3/1935 | Wolf | 128/7 |
| 3,090,378 | 5/1963 | Sheldon et al. | 128/4 |
| 3,253,524 | 5/1966 | Ashizawa et al. | 128/6 |

*Primary Examiner*—Dalton L. Truluck
*Assistant Examiner*—G. F. Dunne
*Attorney*—Kurt Kelman ABSTRACT: An endoscope having a forward end casing adapted to be inserted into a hollow portion of a living body and provided with an objective lens system for forming an image of an object by the light therefrom, a control casing provided with ocular means, an elongated tube connecting the forward end casing and the control casing, and an image transmitting optical system extending through the elongated tube. The forward end of the image transmitting optical system is located behind the objective lens system adjacent thereto so as to form the image of the object on the forward end of the image transmitting optical system so that the image is transmitted through the image transmitting optical system to the rearward end thereof, while the rearward end of the image transmitting optical system is located in front of the ocular means adjacent thereto so that the image thus transmitted to the rearward end of the image transmitting optical system is viewed through the ocular means. The objective lens system comprises at least two lens elements or lens groups each movable along the optical axis. The two lens elements or lens groups are operatively coupled with each other so that the movement of one of the two lens elements or lens groups causes the other to be moved relative thereto to thereby permit the distance between the two lens elements or lens groups to be varied, thus resulting in the variation in the focal length of the objective lens system. String means extends through the elongated tube with its one end connected to a control mechanism provided in the control casing and with its other end connected to one of the two lens elements or lens groups so that the two lens elements or lens groups are moved simultaneously by actuating the string means by the control mechanism.

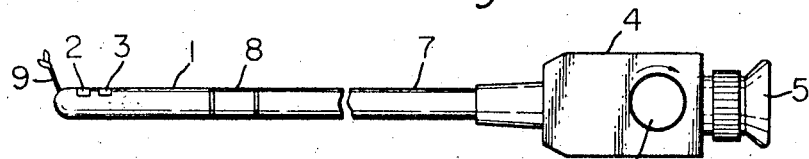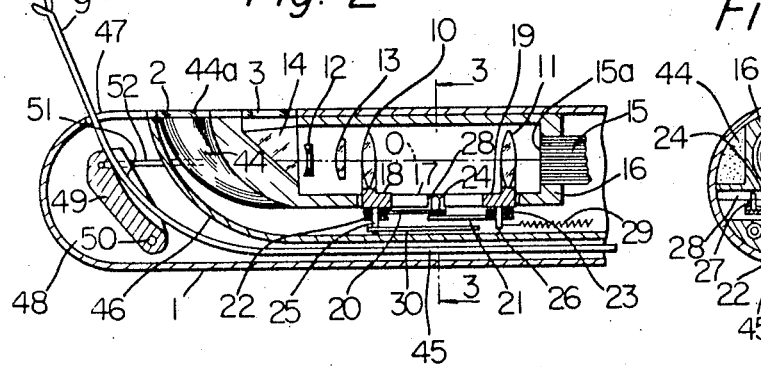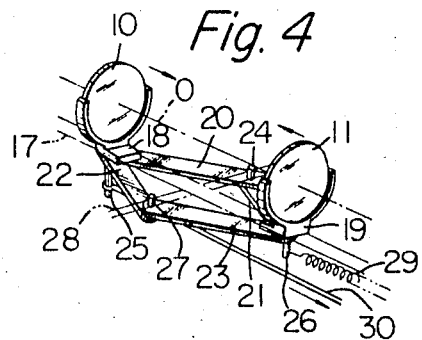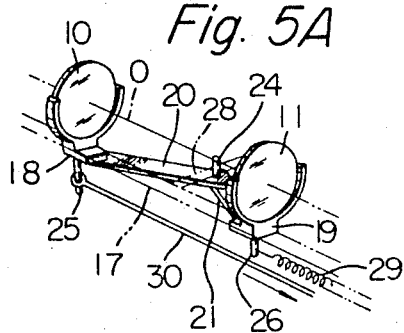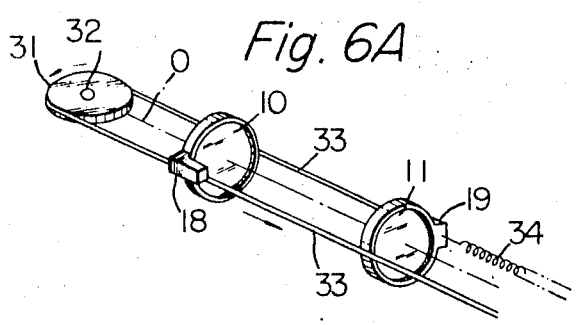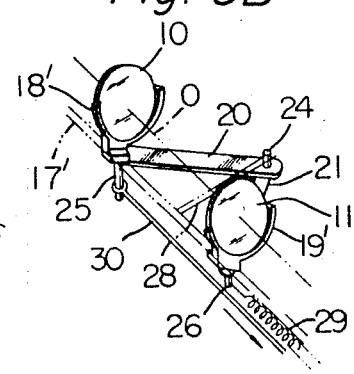
INVENTORS.
SHIGERU YAMAKI
RIKIZO MURATA
BY Kurt Kelman
AGENT INVENTORS.
SHIGERU YAMAKI
RIKIZO MURATA
BY Kurt Kelman
AGENT

ENDOSCOPE

BACKGROUND OF THE INVENTION

The present invention relates to an endoscope and more particularly to an endoscope in which an objective lens system of variable focal length is provided.

In general, a prior art endoscope is provided with a forward end casing adapted to be inserted in a hollow portion of a living body and having an illuminating window and a viewing window in the wall thereof, a control casing provided with ocular means, an elongated tube connecting said forward end casing to said control casing, illuminating optical system provided in said forward end casing for illuminating an object to be inspected by said endoscope through said illuminating window, an objective lens system provided in said forward end casing for receiving the light from the object through said viewing window, and an image transmitting optical system such as a fiber optical system extending through said elongated tube with its forward end located adjacent to said objective lens system and its rearward end located adjacent to said ocular means. The light received by the objective lens system is focused on the forward end of the image transmitting optical system so as to form an image of the object thereon. The thus formed image of the object is transmitted through the image transmitting optical system to the rearward end thereof so that the thus transmitted image is viewed through the ocular means provided in the control casing.

Since the objective lens system of the prior art endoscope is of a fixed focal length, because a complicated construction such as lens rotating means or cylindrical cam means for varying the focal length of the objective lens system cannot be incorporated in the forward end casing due to its limited small diameter such as the diameter equal to or less than 12 mm., the field of view is limited to a predetermined extent thereby necessitating the forward end casing to be largely bent so that it is brought close to the portion to be inspected by the endoscope so as to view the local point to be inspected at greater magnification, when the endoscope is used for inspecting the hollow portion of a living body such as a human body. Further, it often occurs that, when the endoscope is used for inspecting the hollow portion of a human body and the like, the forward end casing of the endoscope cannot be brought appropriately close to the portion to be inspected, thereby making it difficult or impossible to inspect properly the desired local point in the hollow portion.

On the other hand, it is advantageous to construct the endoscope so that not only the local point desired to be inspected can be viewed at greater magnification but also the point to be inspected can be observed together with the area surrounding said point in order to obtain more exact inspection of said point in comparison with the area surrounding the point.

In order to achieve the above-mentioned objective, it is necessary to provide a variable focal length objective lens system in the forward end casing of the endoscope which can be remotely controlled from the control casing so that the field of view of the objective lens system is continuously varied while the endoscope is used for the inspection of the hollow portion in the living body and the like. It is, however, very difficult to incorporate such an objective lens system in the forward end casing having small diameter limited by the application of the endoscope to the hollow portion in a living body and the like having very small diameter, as previously described.

The present invention avoids the disadvantages of the prior art endoscope and provides a novel and useful endoscope of the type described above in which a variable focal length objective lens system is provided, the focal length of which is easily and continuously controlled from the control casing of the endoscope.

SUMMARY OF THE INVENTION

The present invention provides a novel and useful endoscope of the type described above which is provided with a variable focal length objective lens system located in the forward end casing of the endoscope. The objective lens system includes at least two movable lens elements or lens groups each movable along the optical axis of the objective lens system and operatively coupled with each other so that the movement of one of said movable lens elements or lens groups causes the other of said movable lens elements or lens groups to be moved relative to said one of said movable lens elements or lens groups to thereby vary the distance between the said two movable lens elements or lens groups so as to permit the focal length of said objective lens system to be varied. The movement of said one of said two movable lens elements or lens groups is controlled by string means extending through the elongated tube connecting said forward end casing to the control casing and connected with its one end portion to at least one of said two movable lens elements or lens groups and with its other end portion connected to a control mechanism provided in the control casing. Said string means can be actuated by operating the control mechanism so that the movable lens elements or lens groups are moved so as to vary the focal length of the objective lens system.

By the endoscope constructed in accordance with the present invention, the field of view of the objective lens system can be varied by operating the control mechanism.

By another feature of the present invention, at least a pair of links are provided for operatively coupling said two movable lens elements or lens groups, one end of each of said links being swingably connected together so as to be guided for movement in the direction transverse to the optical axis of the objective lens system while the other end of each of said links is swingably connected to the respective movable lens elements or lens groups and the string means is connected to one of the two movable lens elements or lens groups, so that they are moved in opposite directions to each other when said one of the two movable lens elements or lens groups is caused to be moved by pulling or pushing the string means by the operation of the control mechanism. It is apparent that the ratio of the extent of the movement of one of the two movable lens elements or lens groups with respect to that of the other can be varied by making the length of one of the pair of links shorter or longer than that of the other.

In accordance with further feature of the present invention spring means is provided in the above-mentioned arrangement for urging one of the two movable lens elements or lens groups in either one of the two directions along the optical axis of the objective lens system so that the two movable lens elements or lens groups are urged to be moved toward each other or from each other. The string means is connected to the one movable lens element or lens group which is urged in the direction apart from the control casing by the action directly or indirectly applied by the spring means, so that the two movable lens elements or lens groups are moved by only pulling the string means against the action of the spring means by the operation of the control mechanism.

In accordance with another feature of the present invention, the forward end of the string means extends forwardly beyond the two movable lens elements or lens groups to lead-back means provided in the forward end casing for leading back the string means rearwardly therefrom. The extremity of the string means thus led back rearwardly from said lead-back means is connected to spring means so as to resiliently keep the string means in tensioned state. One of the two movable lens elements or lens groups is connected to an appropriate point in the portion of the string means extending from the lead-back means to the spring means while the other of the two movable lens elements or lens groups is connected to an appropriate point in the portion of the string means extending from the lead-back means to the control mechanism, so that the two movable lens elements or lens groups are moved simultaneously toward each other or from each other by pulling the string means against the action of the spring means by the operation of the control mechanism. The lead-back means may be a pulley means rotatably mounted in the forward end casing, around which the string means is stretched. Alternatively, the lead-back means may be constructed by lever means pivotably mounted at its midpoint in the forward end casing, and the string means is divided into two portions, one of which connects one end of said lever means to the spring means and the other of which connects the other end of said lever means to the control mechanism. In case lever means is provided, the ratio of the extent of the movement of one of the above two portions of the string means with respect to that of the other can be varied by shifting the position of the pivot axis of the lever means.

In accordance with still other feature of the present invention, the lens holder holding each of the two movable lens elements or lens groups is provided with a plurality of arms extending therefrom parallel to the optical axis in spaced relation from each other. Each of the arms of one of the two lens holders slidably fits in each of the spaces formed by the adjacent two arms of the other of the lens holders. The portion of the string means led back rearwardly from the lead-back means is connected to one of the lens holders while the portion of the string means extending from the lead-back means toward the control mechanism is connected to the other of the lens holders, thereby permitting the two lens holders to be moved smoothly in the opposite directions to each other by the actuation of the string means. This arrangement makes it possible to construct the variable focal length objective lens system in extremely simple manner and in compact size.

Further, the endoscope of the present invention may incorporate detachable tissue collecting means or the like adapted to be inserted from the control casing through the elongated tube so as to be projected from the forward end casing, thereby permitting the tissue collecting means to be operated from the control casing while the endoscope is used for inspecting the object to be inspected.

Therefore, the object of the present invention is to provide a novel and useful endoscope having a variable focal length objective lens system which has the above described various features separately or in combination.

BRIEF DESCRIPTION OF THE DRAWING

FIG. 1 is a general view showing the endoscope constructed in accordance with the present invention;

FIG. 2 is a longitudinal cross-sectional view in magnified scale showing the forward end casing of the endoscope shown in FIG. 1 provided at the forward end of the flexible elongated tube connecting the forward end casing to the control casing of the endoscope;

FIG. 3 is a cross-sectional view taken along line 3–3 in FIG. 2;

FIG. 4 is a perspective view showing one embodiment of the two movable lens elements provided in the objective lens system of the endoscope of the present invention in which two pairs of links are used to operatively couple the two lens elements;

FIG. 5A is a perspective view similar to FIG. 4 but showing a modification of the two movable lens elements of FIG. 4 in which only one pair of links are used to operatively couple the two lens elements;

FIG. 5B is a perspective view similar to FIG. 5A but showing further modification of the two lens elements;

FIG. 6A is a perspective view showing the second embodiment of the two movable lens elements provided in the objective lens system of the present invention in which string means is used for operatively couple the two lens elements in cooperation with lead-back means comprised of pulley means for leading back string means at the forward end in the forward end casing;

FIG. 6B is a perspective view showing lever means used for leading back string means at the forward end in the forward end casing in place of pulley means shown in FIG. 6A;

DETAILED DESCRIPTION OF THE PREFERRED EMBODIMENTS

Figure 7:
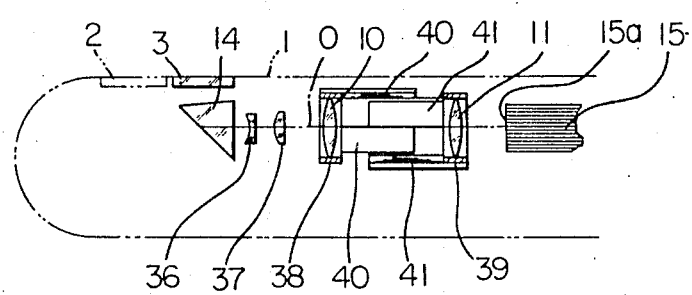
FIG. 7 is a longitudinal sectional view schematically showing the modification of the two movable lens elements in the objective lens system of FIG. 6A with the forward end casing shown by chain dot line.

Referring to FIG. 1, the endoscope of the present invention comprises a forward end casing 1 provided with an illuminating window 2 and a viewing window 3, a control casing 4 provided with ocular means 5 and a control knob 6 for manually operating a control mechanism provided in the control casing 4 the function on of which will be described hereinafter. An elongated tube 7 preferably a flexible tube extends from the control casing 4 and the forward end of the elongated tube 7 is connected to the rearward end of the forward end casing 1 by the interposition of a connecting member 8. The connecting member 8 serves to swing the forward end casing 1 with respect to the forward end of the elongated tube 7 by the operation of an operating mechanism not shown provided in the control casing 4 for facilitating the operation of the endoscope. A tissue collecting means 9 and the like may be detachably inserted from the control casing 4 into the elongated tube 7 so as to be projected from the forward end casing 1 so that the tissue collecting means 9 is operated from the control casing 4 while the endoscope is used for inspection of a hollow portion and the like in a living body such as a human body.

An objective lens system shown as being comprised of a pair of movable lens elements 10, 11 for varying the focal length of the objective lens system and a pair of lens elements 12, 13 for adjusting the focal point of the objective lens system is provided in the forward end casing 1 as shown in FIG. 2. A prism 14 is located in front of the objective lens system so that the light from an object to be inspected is received by the prism 14 through the viewing window 3 in the front end casing 1 and reflected by the prism 14 toward the objective lens system. The lens elements 12, 13 may be moved by a control device not shown provided in the control casing 4 so as to adjust the focal point of the objective lens system. An image transmitting optical system 15 such as an image transmitting fiber optical system extends through the elongated tube 7 with its forward end 15a located behind the objective lens system adjacent thereto in alignment with the objective lens system and with its rearward end located adjacent to the ocular means 5 provided in the control casing 4 in alignment therewith. Therefore, the light from the object and passing through the viewing window 3 is reflected by the prism 14 toward the objective lens and can form an image of the object on the forward end 15a of the image transmitting optical system 15. The image thus formed on the forward end 15a of the image transmitting optical system 15 is transmitted therethrough to the rearward end of the image transmitting optical system 15 and the thus transmitted image can be viewed through the ocular means 5 provided in the control casing 4.

A lens barrel 16 provided in the front end casing 1 mounts fixedly the prism 14 and the forward end 15a of the image transmitting optical system 15 while the pair of movable lens elements 10, 11 and the lens elements 12, 13 are mounted in the lens barrel 16 slidably along the optical axis O of the objective lens as described hereinafter. The lens barrel 16 is provided with a guide slot 17 which extends parallel to the optical axis O of the objective lens system as shown in FIGS. 2 and 4. Lens holders 18, 19 each mounting therein the movable lens elements 10, 11 are slidably engaged with the guide slot 17.

As shown in FIGS. 2, 3 and 4, the two movable lens elements 10, 11 are operably coupled by means of two pairs of links 20, 21 and 22, 23. To this end, one end of the link 20 is swingably connected to one end of the link 21 by means of pin 24 preferably secured fixedly to the link 21, while the other end of the link 20 is pivotally connected to the lower side of the lens holder 18 by means of pin 25 fixedly secured to the lens holder 18 and the other end of the link 21 is pivotably connected to the lower side of the lens holder 19 by means of pin 26 fixedly secured to the lens holder 19. In the similar way; one end of the link 22 is swingably connected to one end of the link 23 by means of pin 27 preferably secured fixedly to the link 22 while the other end of the link 22 is pivotably connected to the lens holder 18 by means of the pin 25 and the other end of the link 23 is pivotably connected to the lens holder 19 by means of the pin 26. The length of the link 20 is made equal to that of the link 22 while the length of the link 21 is made equal to that of the link 23 so that the ratio of the length of the link 20 with respect to that of the link 21 is made equal to the ratio of the length of the link 22 with respect to that of the link 23. Further, the lengths of all of the links 20, 21, 22 and 23 can be made equal to each other. The pins 24, 25 are slidably guided in a guide slot 28 provided in the lens barrel 16 and extending perpendicular to the guide slot 17. One end of spring 29 is attached to pin 26 and the other end of the spring 29 is attached to a stationary point in the forward end casing 1 so that the lens holder 19 is resiliently urged to the left as shown in FIGS. 2 and 4. A string 30 extends in the elongated tube 7 and one end of the string 30 is attached to the pin 25 and the other end of the string 30 is attached to a control mechanism (not shown) provided in the control casing 4 which is manually operated by means of the control knob 6 so that the string 30 is pulled toward the control casing 4 when the control knob 6 is actuated. Since the two movable lens elements 10, 11 are operatively coupled with each other by means of the two pairs of links 20, 21, 22 and 23 with the pins 24, 27 pivotally connecting the respective pairs of links 20, 21 and 22, 23 being guided in the guide slot 28 located transverse to the guide slot 17 located parallel to the optical axis, the two movable lens elements 10, 11 are moved toward each other against the action of the spring 29 by pulling the string 30 by the actuation of the control mechanism by means of the control knob 6, while the two movable lens elements 10, 11 are normally held apart from each other by the action of the spring 29 when the string 30 is released. Thus, the focal length of the objective lens system can be continuously varied by the operation of the control knob 6.

It is apparent that the spring 29 may be attached to the pin 25 so as to urge the movable lens element 10 apart from the other movable lens element 11.

Also, it is apparent that the spring 29 may be attached to either one of the two movable lens elements 10, 11 so as to urge them toward each other, inasmuch as the string 30 is attached to the one of the two movable lens elements 10, 11 which is urged directly or indirectly through the links 20, 21, 22 and 23 toward the direction apart from the control casing 4.

Further, it is apparent that, if the string 30 is of sufficient stiffness so that the two movable lens elements 10, 11 can be moved in either of the directions by pulling or pushing the string 30 by the actuation of the control mechanism, the spring means 29 can be omitted.

When the ratio of the length of each of the links 20, 22 with respect to that of each of the links 21, 23 is made greater or smaller than 1, the extent of the movement of the movable lens element 10 can be made different from that of the other movable lens element 11.

FIG. 5A shows a modification of the construction of the movable lens elements shown in FIG. 4. In this embodiment, the two movable lens elements 10, 11 are operatively coupled by only one pair of links 20, 21. The operation of the embodiment shown in FIG. 5A is similar to that shown in FIG. 4, and therefore, detailed description is not necessary.

FIG. 5B also shows a further modification of FIG. 5A. In this case, the guide slot 17' and the pins 25, 26 secured to the lens holders 18', 19', respectively, are offset to one side from the vertical plane passing through the optical axis O of the objective lens system and the pair of links 20, 21 extends toward the other side of the vertical plane passing through the optical axis O so that the length of each of the links 20, 21 can be made greater than that shown in FIG. 5A in order to assure more reliable operation of the movable lens elements 10, 11.

In all the embodiments as shown in FIGS. 2, 4, 5A and 5B, a further lens element can be incorporated in the two movable lens elements 10, 11 which is operatively coupled to the movable lens elements 10, 11 so that it is moved relatively to lens elements 10, 11 when they are actuated by the control mechanism. To this end, the lens holder of the further lens element is guided for the movement along the optical axis O and a pin is secured to one of the links 20, 21 at a midpoint thereof which is guided in a guide slot provided in the lens holder transverse to the optical axis O.

FIG. 6A shows a second embodiment of the two movable lens elements 10, 11 of the objective lens system in accordance with the present invention.

In FIG. 6A, the lens holder 18 holding the movable lens element 10 is guided in a guide slot (not shown) provided in the lens barrel 16 for the movement along the optical axis O; while the lens holder 19 is guided in another guide slot (not shown) provided in the lens barrel 16 at the opposite side to the guide slot for the lens holder 18 for the movement along the optical axis O. A rotatable pulley 31 is provided in the forward end of the forward end casing 1 at a position beyond the two movable lens elements 10, 11, and the pulley 31 is rotatable about shaft 32 fixed to the forward end casing 1. String 33 extending from the control mechanism through the elongated tube 7 extends forwardly beyond the two movable lens elements 10, 11 and is stretched around the pulley 31 provided in the forward end of the forward end casing 1 and led back rearwardly in the forward end casing 1. The extremity of the string 33 thus led back rearwardly from the pulley 31 is attached to the lens holder 19 holding the movable lens element 11. One end of a spring 34 is attached to the lens holder 19 and the other end of the spring 34 is attached to a stationary point in the forward end casing 1 not shown, so that the string extending from the control mechanism through the elongated tube 7 to the pulley 31 and led back therearound rearwardly to the lens holder 19 is resiliently held in the tensioned state. The lens holder 18 holding the movable lens element 10 is attached to the portion of the string extending from the control mechanism to the pulley 31. Therefore, the two lens elements 10, 11 are moved toward each other when the string 33 is pulled by the operation of the control mechanism against the action of the spring 34, so that the focal length of the objective lens system is continuously adjusted.

This construction is extremely simple and can be made compact so that it is easily incorporated in the forward end casing 1 having the limited diameter such as 12 mm., or lesser.

It is apparent that the extremity of the string 33 led back rearwardly from the pulley 31 can be attached to the lens holder 18 instead of the lens holder 19 and the spring 34 can be attached to the lens holder 18 so as to resiliently keep the string 33 in tensioned state, while the lens holder 19 is attached to the portion of the string 33 extending from the control mechanism to the pulley 31, so that the two movable lens elements 10, 11 can be moved apart from each other by pulling the string 33 by the operation of the control mechanism against the action of the spring 34.

FIG. 6B shows a modification of FIG. 6A. In this embodiment, a lever 35 swingably mounted at its midpoint by shaft 32 in the forward end casing 1. The string is divided into two portions 33a and 33b. The portion 33a of the string extends from the control mechanism through the elongated tube 7 and is attached with its forward end to one end of the lever 35 while the portion 33b of the string is attached with its forward end to the other end of the lever 35 and with its rearward end to either of the lens holders 18, 19 to which the spring 34 is attached for resiliently tensioning the string in the similar manner to that described in connection with FIG. 6A.

The operation of the embodiment shown in FIG. 6B is similar to that of FIG. 6A. However, in the embodiment shown in FIG. 6B, the extent of the movement of the lens holder 10 can be made different from that of the lens holder 11 by making the ratio of the length of one arm of the lever 35, to which the portion 33a of the string is attached, with respect to that of the other arm of the lever 35, to which the portion 33b of the string is attached, greater or smaller than 1.

FIG. 7 shows a further modification of FIG. 6A.

In this case, lens elements 36, 37 are mounted fixedly in the lens barrel (not shown) and the forward end 15a of the image transmitting optical system 15 may be made shiftable by the operation of a control device not shown along the optical axis O with respect to the objective lens system comprised of the stationary lens elements 36, 37 and the two movable lens elements 10, 11 for permitting the focal length of the objective lens system to be varied, so that the focal point of the objective lens system can be made in coincidence with the forward end 15a of the image transmitting optical system 15 by appropriately shifting the forward end 15a by the operation of the control device therefor.

Figure 8:
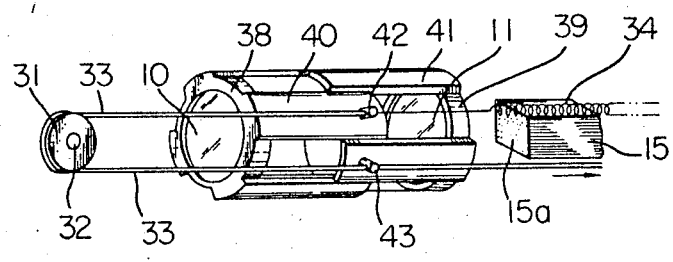
FIG. 8 is a perspective view showing the embodiment of FIG. 7, the two movable lens elements being shown at positions spaced apart from each other by the actuation of string means.

As shown in FIGS. 7 and 8, lens holders 38, 39 holding the movable lens elements 10, 11, respectively, are slidably mounted in a cylindrical lens barrel not shown. The lens holder 38 is provided with a plurality of arms 40 extending therefrom rearwardly along the optical axis O in spaced relation from each other with the clearances each having the same width measured normal to the optical axis O being formed between the adjacent two arms 40. In the similar manner, the lens holder 39 is provided with the same number of arms 41 as the arms 40 extending forwardly therefrom along the optical axis O in spaced relation from each other. The width of each of the arms 41 is so determined that the arms 41 are snugly and slidably engaged in the respective clearances formed between the adjacent two arms 40 of the lens holder 38, so that the two movable lens elements 10, 11 are smoothly shifted relatively to each other along the optical axis O in the cylindrical lens barrel when they are moved by the operation of a control mechanism as described hereinafter.

In the similar way to that shown in FIG. 6A, a string 33 extending from the control mechanism provided in the control casing 4 through the elongated tube 7 extends beyond the two movable lens elements 10, 11 to the pulley 31 and is led back rearwardly therearound. The extremity of the string 33 thus led back rearwardly is attached to pin 42 fixedly secured to one of the arms 40 of the lens holder 38 as shown in FIG. 8. One end of the spring 34 is attached to the pin 42 so as to resiliently keep the string 33 in the tensioned state in the same way as shown in FIG. 6A, a pin 43 fixedly secured to one of the arms 41 of the lens holder 39 is attached to the portion of the string 33 extending from the control mechanism to the pulley 31. Therefore, it is apparent that the two movable lens elements 10, 11 are moved from each other by pulling the string 33 against the action of the spring 33 against the action of the spring 34 by the operation of the control mechanism so that the focal length of the objective lens system can be continuously varied.

Figure 9:
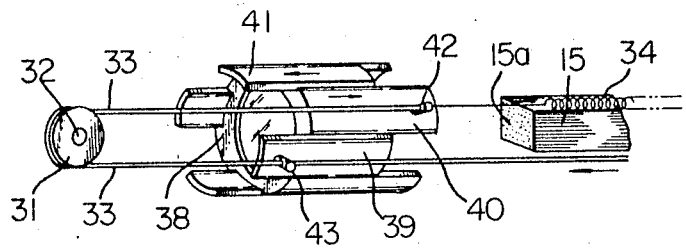
FIG. 9 is a perspective view similar to FIG. 8 but showing the two movable lens elements moved close to each other by releasing the string means.

FIG. 9 shows the embodiment of FIG. 8 under the condition in which the two movable lens elements 10, 11 are moved toward each other by releasing the string 33.

It is apparent that the extremity of the string 33 led back rearwardly around the pulley 31 and the spring 34 can be attached to the pin 42 instead of the pin 42 and the pin 42 can be attached to the portion of the string 33 extending between the pulley 31 and the control mechanism so that the two movable lens elements 10, 11 are moved toward each other by pulling the string 33 by the operation of the control mechanism.

Further, it is possible to replace the pulley 31 with a lever similar to that shown in FIG. 6B so as to obtain the same effect as that of FIG. 6B.

The endoscope in accordance with the present invention is also provided with an illuminating optical system 44 such as a fiber optical system. As shown in FIG. 2, the forward end 44a of the illuminating optical system 44 is located closely behind the illuminating window 2 of the forward end casing 1. The illuminating optical system 44 extends through the forward end casing 1, the elongated tube 7 toward the control casing 4 as shown in FIGS. 2 and 3. The rearward end of the illuminating optical system 44 terminates in the control casing 4 or at any of the appropriate positions adjacent to the control casing 4 externally thereof with the rearward end of the illuminating optical system 44 being projected from either of the control casing 4 or the elongated tube 7 at a position adjacent to the control casing 4.

When the light is directed to the rearward end of the illuminating optical system 44 from a light source not shown, the light is transmitted therethrough to the forward end 44a and illuminates the object to be inspected by the endoscope through the illuminating window 2.

It is apparent that the illuminating optical system 44 can be replaced by an illuminating lamp located behind the illuminating window 2 and energized from the control casing 4.

Finally, the endoscope of the present invention may incorporate detachably a tissue collecting means 9 such as forceps as shown in FIGS. 1 and 2. As shown, the tissue collecting means 9 is inserted from the control casing 4 through hollow portion 45 in the elongated tube 7 and the forward end casing 1 water tightly sealed from the other portion of the endoscope by means of wall means such as wall 46 and projected from the forward end casing 1 through opening 47 thereof. A hollow chamber 48 is provided in the forward end of the forward end casing 1 as shown in FIG. 2, and an actuating member 49 is pivotably provided in the hollow chamber 48 by means of a pin 50 secured to the forward end casing 1. The actuating member 49 is provided with a guide groove 51 for guiding the tissue collecting means 9 engaged therein. The actuation of the actuating member 49 is effected by means of wires 52 extending from the control casing 4 through the elongated tube 7 with the forward end of each of the wires 52 attached to a portion of the actuating member 49 remote from the pivot pin 50. The wires 52 are operated by a control means in the control casing 4 so that the actuating member 49 is pivoted about the pin 50 thereby permitting the tissue collecting means 9 to be bent in any desired direction. Therefore, the desired portion of the tissue can be collected by the tissue collecting means by operating same while the endoscope is used for inspection of the object.

We claim:

1. An endoscope having a forward end casing adapted to be inserted into a hollow portion of a living body and provided with an objective lens system for forming an image of an object by the light therefrom, a control casing provided with ocular means, an elongated tube connecting said forward end casing and said control casing, and an image transmitting optical system extending through said elongated tube with its forward end located behind said objective lens system adjacent thereto so that the image of the object is formed on said forward end thereby to permit the image to be transmitted to the rearward end of said image transmitting optical system therethrough, the rearward end of said image transmitting optical system being located in front of said ocular means adjacent thereto thereby to permit the image thus transmitted to said rearward end to be viewed through said ocular means, wherein the improvement comprises: at least two lens elements or lens groups provided in said objective lens system movable along the optical axis for varying the focal length of said objective lens system and operatively coupled with each other by at least a pair of links with their one ends swingably connected to each other and with their other ends swingably connected to said two lens elements or lens groups, respectively, said one end of said pair of links being guided for movement transverse to the direction of the optical axis of said objective lens system, so that said two lens elements or lens groups are relatively moved simultaneously along the optical axis from each other or toward each other, and string means extending through said elongated tube with its one end portion connected to a control mechanism provided in said control casing and with its other end portion connected to at least one of said two lens elements or lens groups to thereby permit said two lens elements or lens groups to be moved by actuating said string means by said control mechanism.

2. An endoscope according to claim 1, wherein spring means is provided for urging one of said two lens elements or lens groups in one direction so that the other of said two lens elements or lens groups is urged in the opposite direction, said other end portion of said string means being connected to one of said two lens elements or lens groups which is urged forwardly apart from said control mechanism by said spring means thereby permitting said two lens elements or lens groups to be moved by only pulling said string means by means of said control mechanism against the action of said spring means.

3. An endoscope having a forward end casing adapted to be inserted into a hollow portion of a living body and provided with an objective lens system for forming an image of an object by the light therefrom, a control casing provided with ocular means, an elongated tube connecting said forward end casing and said control casing, and an image transmitting optical system extending through said elongated tube with its forward end located behind said objective lens system adjacent thereto so that the image of the object is formed on said forward end thereby to permit the image to be transmitted to the rearward end of said image transmitting optical system therethrough, the rearward end of said image transmitting optical system being located in front of said ocular means adjacent thereto thereby to permit the image thus transmitted to said rearward end to be viewed through said ocular means, wherein the improvement comprises: at least two lens elements or lens groups provided in said objective lens systems movably along the optical axis for varying the focal length of said objective lens system, string means extending through said elongated tube forwardly toward the forward end of said forward end casing beyond said two lens elements or lens groups to lead-back means located in said forward end of said forward end casing for leading back said string means rearwardly therefrom with its one end portion connected to a control mechanism in said control casing and with its other end portion which is thus lead rearwardly from said lead-back means connected to spring means for urging said other end portion apart from said forward end thereby resiliently keeping said string means in tensioned state, one of said two lens elements or lens groups being connected to the portion of said string means extending between said lead-back means and said spring means while the other of said lens elements or lens groups is connected to a portion of said string means extending from said lead-back means toward said control mechanism so that the movement of one of said two lens elements or lens groups in one direction causes the other to be moved in the opposite direction relative thereto thereby permitting said two lens elements or lens groups to be moved simultaneously in opposite directions to each other by only pulling said string means by means of said control mechanism against the action of said spring.

4. An endoscope according to claim 3, wherein said lead-back means comprises pulley means rotatably mounted in the forward end of said forward end casing around which said string means is stretched.

5. An endoscope according to claim 3, wherein said lead-back means comprises lever means swingably mounted at the midway thereof in the forward end of said forward end casing, said string means being divided into two portions, one of said two portions being connected with its one end to one end of said lever means and with its other end to said spring means while the other of said two portions is connected with its one end to the other end of said lever means and with its other end to said control mechanism.

6. An endoscope according to claim 3, wherein one of said two lens elements or lens groups is mounted in a lens holder guided for movement along the optical axis of said objective lens system and provided with a plurality of arms extending therefrom toward the other of said lens elements or lens groups in spaced relationship from each other parallel to the optical axis while the other of said lens elements or lens groups is mounted in a lens holder guided for movement along the optical axis of said objective lens system and provided with the corresponding number of arms to those of the first mentioned lens holder extending therefrom toward said one of said lens elements or lens groups in spaced relationship from each other parallel to the optical axis, each of the arms of said last-mentioned lens holder being slidably fitted snugly in the respective spaces between the adjacent two arms of said first-mentioned lens holder so that said two lens elements or lens groups are smoothly moved in opposite directions to each other by the actuation of said string means.